Jan. 16, 1951     F. L. LEATHERMON     2,538,205
SELECTIVE VEHICLE JACK SYSTEM
Filed Sept. 24, 1945

INVENTOR.
FRED L. LEATHERMON.

BY Lockwood, Goldsmith & Galt,
ATTORNEYS.

Patented Jan. 16, 1951

2,538,205

UNITED STATES PATENT OFFICE 2,538,205

SELECTIVE VEHICLE JACK SYSTEM

Fred L. Leathermon, North Madison, Ind.

Application September 24, 1945, Serial No. 618,196

4 Claims. (Cl. 251—104)

This invention relates to a valve structure for a pressure fluid operable jacking system for motor vehicles.

One chief object of the present invention is to provide a single valve structure for selectively and simultaneously controlling the several elevator structures of the jacking system, each structure having a single common supply and exhaust line, thereby reducing the leakage hazard to a minimum as well as the expense of such a system.

The chief feature of the present invention resides in the single manually operable control valve unit.

Other objects and features of the invention will be set forth more fully hereinafter.

The full nature of the invention will be understood from the accompanying drawings and the following description and claims:

In the drawings—

Fig. 7 is a schematic valve position diagram.

Figure 1:
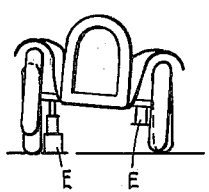
Fig. 1 is a diagrammatic front elevation of an automobile with right front wheel only elevated.
Figure 2:
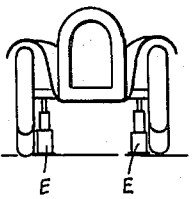
Fig. 2 is a similar view with both front wheels elevated.
Figure 3:
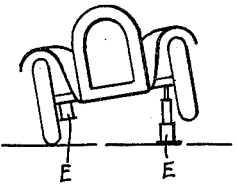
Fig. 3 is a similar view with both left side wheels in elevated position.

Referring to Figs. 1 to 3 inclusive, same are representative of the system which comprises, as stated, a fluid pressure operable elevator E at each vehicle wheel and normally retracted into suspended and collapsed position, and which, when extended, elevates the axle, wheel carried thereby, and the adjacent portion of the vehicle frame, etc.

Fig. 1 is illustrative of the extension of any one jack for one wheel elevation. Herein the right front wheel is shown elevated.

Figs. 2 and 3 are illustrative of simultaneous dual wheel elevation. Fig. 2 shows elevation, one fore and aft pair, and more particularly the front wheels.

Fig. 3 illustrates the elevation of one side or the other, and herein both front and rear left side wheels.

It is to be understood that, see Fig. 2, the rear pair may be elevated, or see Fig. 3, the right-hand pair may be elevated, or for storage, or tire crossing purposes all four wheels may be elevated simultaneously.

Figure 4:
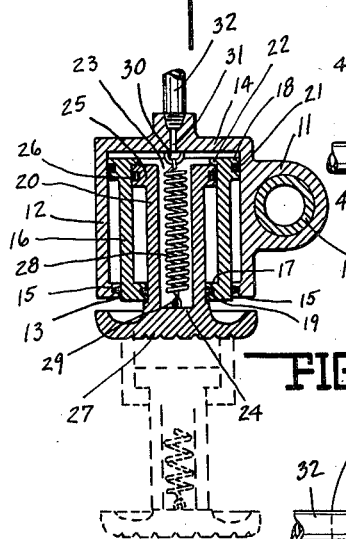
Fig. 4 is a central sectional view of a preferred form of elevator structure for a vehicle wheel.

Reference will now be had to Fig. 4 wherein one of the four elevator or jack units is illustrated.

Herein 10 indicates a vehicle axle and 11 a suitable bracket rigidly secured thereto in any suitable manner not shown. 12 indicates a cylinder having an open end 13 and a comparatively closed end 14. In the open end is peripheral seal 15 bearing upon a combination cylinder and piston 16.

The latter includes the flanged ends 17 and 18, oppositely directed, and the former slidably supports inner piston 20, the same being suitably sealed against leakage as at 19. Flange 18 carries ring 21. Opposite flange 18 is stop flange or ring 22 suitably secured to the combination piston-cylinder 16.

Piston 20 includes a tubular bore 23 closed at 24 at the end opposite the cylinder closed end 14. An outwardly directed flange 25 is adapted to co-operate with stop 22 and carries ring 26. The closed end 24 carries a corrugated or like foot structure 27.

A single coil spring 28 secured at 29 and 30 between the outer cylinder and innermost piston and nested therein is thus protected against moisture, dirt and the like and constrains the entire elevator to collapsed position.

The closed end 14 of cylinder 12 is ported as at 31 and connected thereto is the combined inlet and outlet 32. The elevator is normally constrained by spring 28 to collapsed and suspended relation relative to axle 10 and supported thereby. When pressure fluid is supplied to line 32, the two pistons are sufficiently extended so that the exposed end of cylinder-piston 16 in effect can engage foot 27 and thereafter both move together until flange 18 contacts flange 13. Further pressure application extends piston 20 until foot 27 engages the wheel supporting surface and the wheel and axle are elevated. Maximum extension and wheel elevation are limited by flange 25 engaging flange 17.

Now when it is desired to hold the wheel and axle elevated, the pressure fluid is trapped or locked in the elevator and line 32. When it is desired to lower the wheel and axle and retract or collapse the elevator or jack, the pressure fluid is released from line 32 and same discharges to a non-pressure reservoir.

The degree of valving in the latter instance regulates the character of lowering action desired. Until the wheel bears upon the ground, the latter insures cylinder discharge. Thereafter spring 28 only is effective until all effective fluid is discharged and the jack collapsed to the full line position.

Four valves may thus individually connect each of lines 32 for the four cylinders to a pressure header or to an exhaust header or hold the pressure fluid in the cylinder or cylinders as illustrated in Figs. 1 to 3 and as described relative to the last mentioned disclosure hereinbefore mentioned.

In the preferred form, however, a single valve unit is employed and same is more fully illustrated in Figs. 5 to 8. Therein 40 indicates a line adapted to continuously supply pressure liquid to the control valve having head 41 and body 42 detachably connected together in leakproof relation, the cylinder bore 42a being tapered. Head 41 includes internal central boss 41a and a spring 43 bears against the head and is located by said boss.

A conical valve member 44 is chambered as at 45 confronting the head and includes collar 44a so that spring 43 at its opposite end is located thereby and bears against the valve member to maintain same seated as it were in the bore 42a.

Body 42 is centrally apertured as at 46 to rotatably and slidably support stem 47 of valve member 44. This aperture is enlarged and threaded at 48 to take the gland structure 49. Brackets 50 carried by body 42 are suitably secured at 51 to the dash D apertured at D' to pass stem 47.

Associated therewith is a locator plate 52 having the tubular type socket 53 therein for rotatably and slidably supported hub 54 of hand wheel 55 secured to the exposed end of stem 47. The periphery of the hub is provided with suitably spaced recesses 56 and a ball lock 57 is yieldingly mounted as at 58 in the socket wall.

When the hand wheel 55 is rotated, valve 44 is identically rotated, the ball yielding in such rotation and seating in a recess 56 selected by wheel position. The hub or collar 54 also includes peripheral groove 59. When the hand wheel is pressed inwardly, the valve 44 is moved away from the tapered bore 42a in opposition to spring 43.

Ball lock 57 then seats in groove 59, and the valve is held in the pressure release position. When it is desired to supply fluid pressure to one or more jack structures, the hand wheel is rotated to the desired position required for selection purposes and pulled out until ball 57 registers with and seats in the corresponding recess 56. Thus pressure supply to any unit is not effected until the selection is made, and then only to the selected unit or units.

Upon jack extension the valve may be slightly rotated, and in an amount insufficient to connect any other unit to the pressure supply. Thus pressure will be held in the selected unit or units. For release as stated, wheel 55 may be pushed inwardly the desired amount for graduated release or to the full extent for instantaneous release. Since valve 44 seats in tapered bore 42a upon pull-out of wheel 55 or when released to spring 43, a small bleed port 60 is provided so that fluid trapped in the tapered bore may pass back into the pressure side thereof.

The valve casing has provided therein two diametrically positioned rearward ports RR and LR and two diametrically positioned forward ports RF and LF and to each is connected one of the lines 32 of which there are four, one to each of the four elevator structures.

The valve body 42 midway between the pairs of ports has a fifth port R connected to line 61 leading to the fluid reservoir or crankcase as desired and always in free communication therewith.

Figure 6:
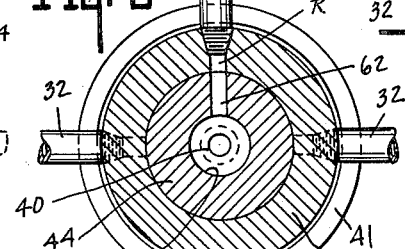
Fig. 6 is a transverse sectional view taken on line 6—6 of Fig. 5 and in the direction of the arrows.
Figure 8:
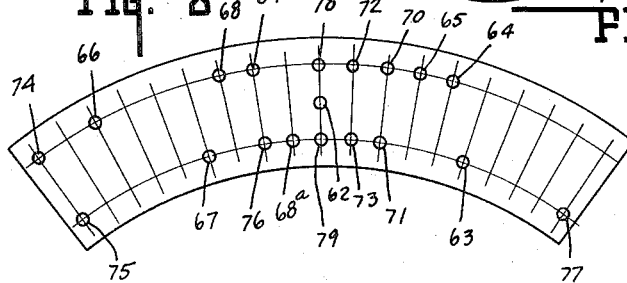
Fig. 8 is a developed plan view of the single frusto-conical valve member.

The chambered valve member 44 includes radial passage 62 which when hand wheel 55 is medianly or "0" positioned, see Figs. 6 and 7, permits pressure fluid from supply line 40 to pass into the valve body, pass through the valve member at that passage and discharge directly to port R and line 61 with which it then registers and freely communicates. Continuously supplied pressure fluid can thus freely cycle or circulate without elevator actuation. This is illustrated in Fig. 6.

The valve member 44, when seated, has in the two planes defined by the ports and lines 32 two peripheral series of radial passages having proper spacing to be now specified.

When the wheel 55 is turned clockwise to step 1, the RR port registers with radial passage 63 only. When turned similarly to step 2, port RF registers with radial passage 64 only. When turned similarly to step 3, ports RF and LF register with radial passages 65 and 66 only for front wheel elevation. When turned to step 4, ports RR and RF register with radial passages 70 and 71 only respectively for right side elevation. When rotated to the fifth position, ports 78, 79, 74 and 75 simultaneously connect all lines 32 to all elevators for simultaneously lifting of all wheels.

When the wheel 55 is turned counterclockwise from the zero "0" position to step 1, port LR registers with radial passage 67 only. When similarly turned to step 2, port LF registers with radial passage 68 only. When similarly turned to step 3, ports LF and LR register with radial passages 69 and 76 only respectively for left side elevation.

When turned to step 4, passages LR, ports LR and RR register with radial passages 68a and 77 only respectively for rear end elevation. Step 5 in the same direction registers ports 78, 79, 74 and 75 with all pipes 32. This corresponds obviously to raising all four wheels simultaneously.

Thus in eleven positions it is possible to obtain free circulation, any wheel elevation, either side elevation, either front or back elevation, or entire (four wheel) elevation. As previously set forth, pressing in on the hand wheel releases the valve from seated position so that any and all liquid in the jack or jacks is exhausted through line 61, notwithstanding pressure supply at line 40.

Obviously a pressure relief device to waste the surplus pressure fluid must be provided when the valve is held seated and the line 61 does not register with passage 62.

Figure 9:
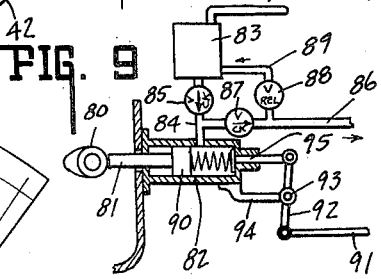
Fig. 9 is an elevational view of an engine operable system and independent of the lubrication system of the engine.

Reference will now be had to Fig. 9 wherein 80 indicates an engine driven cam reciprocating plunger 81 in cylinder 82. A reservoir 83 has a supply line 84 check controlled at 85 to the cylinder and a pressure discharge line 86 check controlled at 87. A relief valve 88 in relief line 89 prevents accumulation of excessive pressure in the common pressure supply 86.

A piston 90 in cylinder 82 is reciprocable therein when conditioned for operation. Piston 90 sucks in fluid from line 84 and forces it out to line 86. The control includes throttle rod 91 pivotally connected to lever arm 92 pivoted at 93 on bracket 94 carried by the cylinder. This arm connects to the yielding connection 95 to the piston 90. Normally piston 90 does not have operative contact with plunger 81 unless rod 91 is pulled to the right. In this operation the pressure stroke of the piston 90 is now cam actuated and the suction stroke is spring actuated. Herein also line 96 indicates the waste or return.

Figure 5:
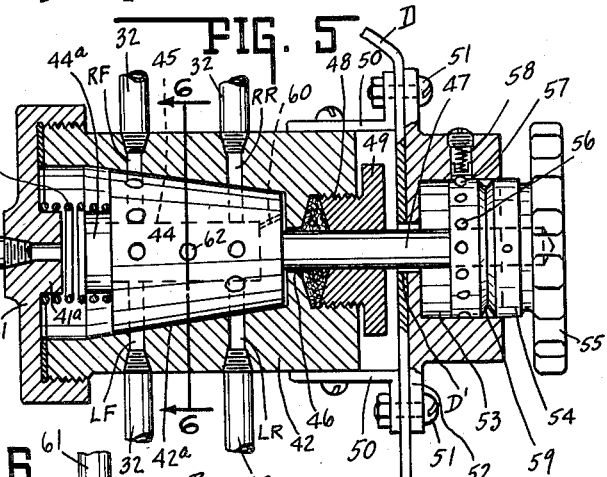
Fig. 5 is a central sectional view of a preferred form of single control valve together with a dash mounting thereof.

Waste line 96 connects to line 61 in Fig. 6 and pressure line 86 connects to supply line 40 in Figs. 5 and 6.

While the invention has been illustrated and described in great detail in the drawings and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. In a multi-purpose control valve structure adapted for interpositioning between a single pressure fluid supply line, a single waste line, and a plurality of common purpose combined inlet, holding and outlet lines, the combination of a valve casing, a casing enclosed valve member core therein, and a single manually operable member extending through the casing and secured to the core for selective rotation and reciprocation thereof, said casing having four ports therethrough and connected to the common purpose lines and arranged in pairs in opposite sides of the casing, the ports in each side being disposed in fore and aft positions relative to each other, the supply being connected to the casing opposite the end thereof through which the manually operable member extends, the casing having a waste port therethrough with which the waste line connects, the core normally sealing the waste port, the casing and core having complementary frusto conical surfaces, the core having a central chamber in free communication with the supply at all times, the core having a waste port therein adapted for selective registration with the casing waste port, the core further having a plurality of ports therethrough disposed in two annularly arranged series and arcuately spaced in each series, the series spacing being that of the fore and aft spacing for selective independent and multiple registration with from one to four of the first mentioned four casing ports.

2. A valve structure as defined by claim 1 wherein all four casing ports are disposed in a single diametral plane.

3. A valve structure as defined by claim 2 wherein the casing waste port is positioned substantially equidistant from all four casing ports.

4. A valve structure as defined by claim 1 wherein the valve core member terminates in a central collar portion and the confronting casing end includes a coaxially disposed core directed collar portion, and a coiled spring is interposed between the core and casing and at opposite ends envelops said collars.

FRED L. LEATHERMON.

REFERENCES CITED

The following references are of record in the file of this patent:

UNITED STATES PATENTS

| Number | Name | Date |
|---|---|---|
| 1,769,534 | Nattrass | July 1, 1930 |
| 1,907,208 | Lebel | May 2, 1933 |
| 2,056,954 | Bryant | Oct. 13, 1936 |

FOREIGN PATENTS

| Number | Country | Date |
|---|---|---|
| 371,701 | Italy | June 1, 1939 |